N. H. GILLET.
Reflector.

No. 43,581.

Patented July 19, 1864.

Witnesses:
Thos. Geo. Harvey
Chas. H. Smith

Inventor:
N. H. Gillet

UNITED STATES PATENT OFFICE.

NOAH H. GILLET, OF NEW YORK, N. Y.

IMPROVED MEANS FOR RENDERING ARTIFICIAL LIGHT THE SAME AS DAYLIGHT.

Specification forming part of Letters Patent No. 43,581, dated July 19, 1864.

*To all whom it may concern:*

Be it known that I, NOAH H. GILLET, of the city and State of New York, have invented or discovered a certain Means for Rendering Artificial Light the same Color as Daylight; and I do hereby declare the following to be a full, clear, and exact description of the nature of the said discovery and the mode of its application to useful purposes.

It is well known that all artificial lights possess more or less of a reddish tint, that seriously interferes with the distinguishing of colors by such lights. Greens, blues, yellows, and their combinations often cannot be distinguished by artificial light; hence paintings cannot be colored with reliability, except by daylight, and when viewed by artificial light the harmony and beauty of color are lost. Besides this, persons who have to work by artificial lights find the eyes tire and become weak by the action of the red rays from such lights.

I have discovered that a light or sky blue glass introduced before an artificial light renders that light white and apparently colorless, and at the same time the blue of the glass becomes invisible, and that light shining through such intervening glass will show all colors in the same shades as when seen by daylight, and also that the light does not cause the eye to tire or become weak any more than ordinary daylight. The blue glass may be obtained by the ordinary staining operation, or it may be painted with transparent colors, the former being preferable. As the intensity of the light is somewhat lessened by the glass, a reflector should be employed that may be placed behind the light only, or may extend in front of such light, and the blued glass may be at the extremity of the reflector or at any desired point so long as the light passes through the same before reaching the objects viewed.

Figure 1:
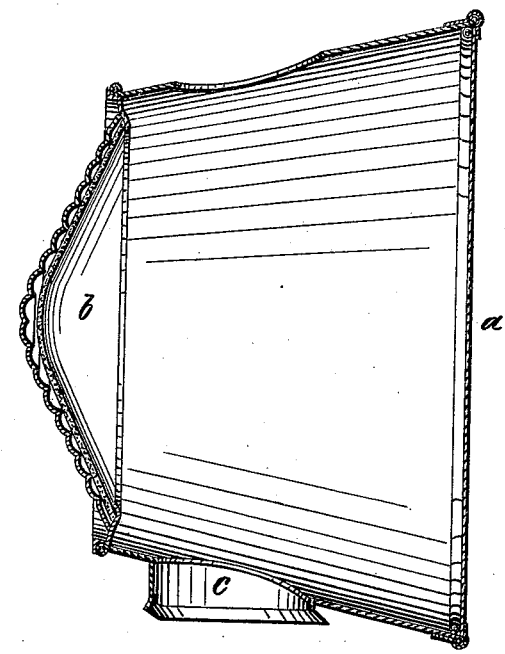
Figure 2:
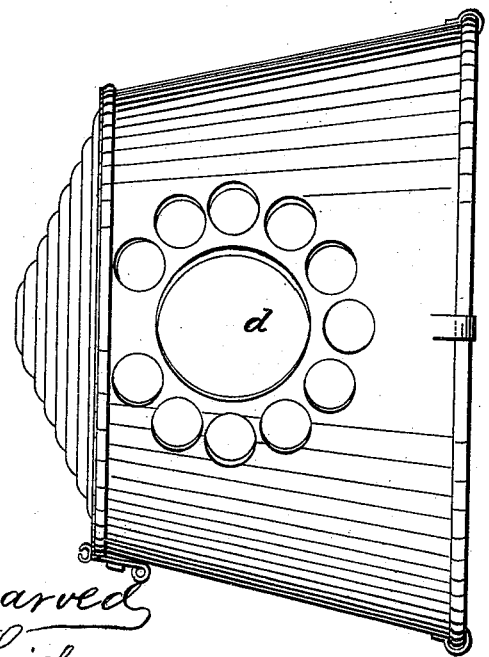

In the drawings, Figure 1 is a vertical section with my invention of a blue glass, *a*, applied to a reflector, *b*, so that the light introduced into said reflector through the opening *c* may be rendered white as it shines through said glass. Fig. 2 is a plan of the said reflector, showing the opening *d* for the gases and heated air rising from the light.

The shade of blue may be slightly varied, according to the intensity of the light; but the nearer the same is to sky-blue the more efficient I find it to be in neutralizing the red rays of the artificial light.

What I claim, and desire to secure by Letters Patent, is—

Rendering artificial light the same color as daylight by an intervening glass of the color specified.

In witness whereof I have hereunto set my signature this 4th day of April, 1864.

N. H. GILLET.

Witnesses:
 CHAS. H. SMITH,
 THOS. GEO. HAROLD.